(12) United States Patent
Zhao et al.

(10) Patent No.: US 11,384,900 B2
(45) Date of Patent: Jul. 12, 2022

(54) HANDHELD GIMBAL

(71) Applicant: SZ DJI TECHNOLOGY CO., LTD., Shenzhen (CN)

(72) Inventors: Tianfei Zhao, Shenzhen (CN); Shiqiang Zhou, Shenzhen (CN); Minzhao Xie, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/143,641

(22) Filed: Jan. 7, 2021

(65) Prior Publication Data
US 2021/0123564 A1  Apr. 29, 2021

Related U.S. Application Data

(63) Continuation of application No. PCT/CN2019/088667, filed on May 27, 2019.

(51) Int. Cl.
*F16M 13/04* (2006.01)
*G03B 17/56* (2021.01)
(Continued)

(52) U.S. Cl.
CPC .......... *F16M 13/04* (2013.01); *F16M 11/123* (2013.01); *F16M 11/18* (2013.01); *G03B 17/561* (2013.01); *F16M 2200/041* (2013.01)

(58) Field of Classification Search
CPC ........ F16M 11/00; F16M 11/02; F16M 11/04; F16M 11/041; F16M 11/06; F16M 11/12; F16M 11/121; F16M 11/123; F16M 11/125; F16M 11/126; F16M 11/128; F16M 11/18; F16M 11/20; F16M 11/2007; F16M 11/2035; F16M 11/2042; F16M 11/205; F16M 13/00; F16M 13/02; F16M 13/022;
(Continued)

(56) References Cited

U.S. PATENT DOCUMENTS

2021/0258462 A1* 8/2021 Goldburt ............ H04N 5/22525

FOREIGN PATENT DOCUMENTS

CN  205781893 U  12/2016
CN  108980587 A  12/2018
(Continued)

OTHER PUBLICATIONS

International Search Report of PCT/CN2019/088667 (dated Feb. 26, 2020).

*Primary Examiner* — Clayton E. La Balle
*Assistant Examiner* — Fang-Chi Chang
(74) *Attorney, Agent, or Firm* — Fideli Law PLLC (57) ABSTRACT

A handheld gimbal includes a handle, a first shaft assembly having a first motor connected to a top portion of the handle and a first shaft arm, a second shaft assembly having a second motor and a second shaft arm fixedly connected to the second motor, a third shaft assembly having a third motor and a third shaft arm, a holder fixedly connected to a rotor of the third motor, and a rotatable connecting member, where one end of the third shaft arm is fixedly connected to the second motor, and another end of the third shaft arm is fixedly connected to the third motor; one end of the first shaft arm is fixedly connected to the first motor, and another end of the first shaft arm is rotatably connected to the second shaft arm via the rotatable connecting member.

20 Claims, 6 Drawing Sheets

(51) Int. Cl.
*F16M 11/12* (2006.01)
*F16M 11/18* (2006.01)

(58) Field of Classification Search
CPC .. F16M 13/04; F16M 2200/041; G03B 17/56; G03B 17/561; G03B 17/563; G03B 17/566
See application file for complete search history.

(56) References Cited

FOREIGN PATENT DOCUMENTS

| | | |
|---|---|---|
| CN | 208253098 U | 12/2018 |
| CN | 208503902 U | 2/2019 |
| CN | 208703455 U | 4/2019 |
| CN | 210050550 U | 2/2020 |
| KR | 20170099073 A | 8/2017 |

\* cited by examiner

HANDHELD GIMBAL

RELATED APPLICATIONS

This application is a continuation application of PCT application No. PCT/CN2019/088667, filed on May 27, 2019, and the content of which is incorporated herein by reference in its entirety.

TECHNICAL FIELD

The present disclosure relates to the gimbal field, and in particular, to a handheld gimbal.

BACKGROUND

In the existing technologies, a patented utility model with publication No. CN208253098U discloses a handheld stabilizer. In the handheld stabilizer, one end of a first connecting arm is hinged to an upper end of a handle, and another other end of the first connecting arm is hinged to one end of a second connecting arm. When the handheld stabilizer is not in use, the first connecting arm can be folded downward, and after the folding, a total length of the handheld stabilizer is reduced. In addition, after the second connecting arm is folded, the second connecting arm keeps parallel with the handle, and a clamping portion is located between the handle and the second connecting arm. This reduces a total volume of the handheld stabilizer, and makes it convenient to store and carry the handheld stabilizer.

In storage of a conventional handheld stabilizer, there are still gaps between a first connecting arm and a first motor, between the first motor and a second motor, and between a second shaft arm and a holding portion, and thus the handheld stabilizer is not compact enough for storage. In addition, after a clamping portion is folded, the clamping portion cannot continue to clamp a photographing apparatus. Therefore, in device storage, a user needs to store the handheld stabilizer and the photographing apparatus separately, and steps of storing the conventional foldable handheld stabilizer are complex.

SUMMARY

The present disclosure provides a handheld gimbal.

Specifically, the present disclosure is implemented through the following technical solution:

According to a first aspect of the present disclosure, a handheld gimbal is provided, including: a handle, including a top portion, a bottom portion, and a sidewall located between the top portion and the bottom portion; a first shaft assembly, including a first motor connected to the top portion, and a first shaft arm; a second shaft assembly, including a second motor, and a second shaft arm fixedly connected to the second motor; a third shaft assembly, including a third motor and a third shaft arm, where one end of the third shaft arm is fixedly connected to the second motor, and another end of the third shaft arm is fixedly connected to the third motor; a carrier, fixedly connected to a rotor of the third motor; and a rotatable connecting member, disposed between the first shaft arm and the second shaft arm, where one end of the first shaft arm is fixedly connected to the first motor, another end of the first shaft arm is rotatably connected to the second shaft arm via the rotatable connecting member, and the handheld gimbal is caused to switch between a storage state and a use state by a relative rotation between the first shaft arm and the second shaft arm, in the storage state, the first shaft arm and the second shaft arm are folded along the rotatable connecting member, so that the second shaft arm attaches to one side of the first motor and the first shaft arm away from the top portion, and at least a part of the third motor abuts against the sidewall of the handle, in the use state, a preset angle is formed between the first shaft arm and the second shaft arm, the first motor is rotatable around a first axis of rotation, the second motor is rotatable around a second axis of rotation, and the third motor is rotatable around a third axis of rotation, so as to control a posture change of the carrier.

As can be seen from the technical solutions provided by the above embodiments of the present disclosure, the handheld gimbal of the present disclosure can change the shape of the handheld gimbal by means of the cooperation between various structures, so that when the handheld gimbal is stored, the gaps between these structures become smaller, and thus making the handheld gimbal more compact in storage. At the same time, the carrier of the handheld gimbal of the present disclosure will not be limited between the shaft arm(s) and the handle after folding, which is beneficial to the storage of the handheld gimbal, helps the switch between the use state and the storage state of the handheld gimbal. The folding structure is compact, the operation is sample, and the storage is convenient.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some exemplary embodiments of the present disclosure, and a person of ordinary skill in the art may still derive other drawings from these accompanying drawings without creative efforts.

REFERENCE NUMERALS 1. handle; 11. top portion; 111. first slot; 12. bottom portion; 13. sidewall. 131. limiting surface;
2. first shaft assembly; 21. first motor; 211. second slot. 22. first shaft arm; 221. locking protrusion;
3. second shaft assembly; 31. second motor; 311. limiting protrusion; 32. second shaft arm;
4. third shaft assembly; 41. third motor; 42. third shaft arm;
5. holder;
6. rotatable connecting member;
7. step portion;
8. locking member;
100. photographing apparatus.

DETAILED DESCRIPTION

In embodiments of the present disclosure, a handheld gimbal may include a handle and a stabilizing gimbal mechanism connected to the handle, where the stabilizing gimbal mechanism includes a first shaft assembly, a second shaft assembly, a third shaft assembly, a holder, and a rotatable connecting member. The stabilizing gimbal mechanism can be not only detachably connected to the handle, but also detachably connected to another vehicle, for example, an unmanned aircraft, a vehicle, or a remotely controlled ground vehicle. The stabilizing gimbal mechanism may be quickly connected to the foregoing vehicles, so that the stabilizing gimbal mechanism may be switched between different vehicles. For example, connections of the stabilizing gimbal mechanism may be switched between the unmanned aircraft and the handle, or may be switched between the remotely controlled ground vehicle and the handle.

In some exemplary embodiments, the stabilizing gimbal mechanism is connected to the handle, and the handle has a top portion, a bottom portion, and a sidewall located between the top portion and the bottom portion. The first shaft assembly may include a first motor connected to the top portion and a first shaft arm. The second shaft assembly may include a second motor and a second shaft arm. The third shaft assembly may include a third motor and a third shaft arm.

In some exemplary embodiments of the present disclosure, the rotatable connecting member is disposed between the first shaft arm and the second shaft arm. One end of the first shaft arm is fixedly connected to the first motor, and the other end of the first shaft arm is rotatably connected to the second shaft arm via the rotatable connecting member. One end of the second shaft arm away from the first shaft arm rotatably connected to the second shaft arm is fixedly connected to the second motor. One end of the third shaft arm is fixedly connected to the second motor, and the other end of the third shaft arm is fixedly connected to the third motor. Further, the holder is fixedly connected to a rotor of the third motor.

With relative rotation between the first shaft arm and the second shaft arm, the handheld gimbal is caused to switch between a storage state and a use state. A positional relationship between the first shaft arm and the second shaft arm may be changed by using the rotatable connecting member. Therefore, the switching of the handheld gimbal between the use state and the storage state is achieved, a folding structure thereof is simple, the operations are convenient, and the costs are relatively low.

When the handheld gimbal is switched to the use state, a preset angle is formed between the first shaft arm and the second shaft arm. The first motor may rotate around a first axis of rotation, the second motor may rotate around a second axis of rotation, and the third motor may rotate around a third axis of rotation, so as to control a posture change of the holder.

Compactness of the handheld gimbal in storage may be achieved through various strategies. For example, in some exemplary embodiments, when the handheld gimbal is switched to the storage state, the first shaft arm and the second shaft arm may be folded along the rotatable connecting member, so that the second shaft arm may attach to one side of the first motor and the first shaft arm away from the top portion, and at least a part of the third motor abuts against the sidewall of the handle.

In some exemplary embodiments, when the handheld gimbal is switched from the use state to the storage state, a motor may switch from a power-on mode to a power-off mode directly. In contract, when the handheld gimbal switches from the storage state to a deployed state, each motor may switch from a power-off mode to a power-on mode for direct use. For example, when the handheld gimbal is switched from the deployed use state to the storage state, the first shaft arm and the second shaft arm perform relative rotation. In this case, the first shaft arm and the second shaft arm rotate relatively, to the extent where an angle between an extension direction of the first shaft arm and an extension direction of the second shaft arm is less than a certain angle, at least one of the first motor, the second motor and the third motor may switch from the power-on mode to the power-off mode.

That an angle between an extension direction of the first shaft arm and an extension direction of the second shaft arm is less than a certain angle may be that the angle is less than 90°, 80°, 70°, 45°, or the like. This is not specifically limited herein.

That at least one of the first motor, the second motor and the third motor switches from the power-on mode to the power-off mode may be that only the first motor, or only the second motor, or only the third motor switches from the power-on mode to the power-off mode. Certainly, two of the motors, for example, the first motor and the second motor, or the first motor and the third motor, or the second motor and the third motor, may switch from the power-on mode to the power-off mode. Certainly, these three motors may all switch from the power-on mode to the power-off mode.

Therefore, when the handheld gimbal is switched from the deployed use state to the folded storage state, the motor directly switches from the power-on mode to the power-off mode, or when the handheld gimbal is switched from the folded storage state to the deployed use state, the motor directly switches from the power-off mode to the power-on mode. This not only saves battery power of the handheld gimbal, but also is more conducive for users to conveniently operate the handheld gimbal.

In some exemplary embodiments, when the handheld gimbal is switched to the storage state, the first shaft arm and the second shaft arm are folded along the rotatable connecting member, so that the second shaft arm may attach to one side of the first motor and the first shaft arm away from the top portion, the first motor and the second motor are arranged side by side, and the first motor and the second motor abut against each other, so that the first motor and the second motor limit each other.

In some exemplary embodiments, the third shaft arm has a turning point. When the handheld gimbal is switched to the storage state, the first shaft arm and the second shaft arm are folded along the rotatable connecting member, so that the second shaft arm may attach to one side of the first motor and the first shaft arm away from the top portion, and a shape of the third shaft arm adapts to a shape of the sidewall of the handle, so that at least a part of the third shaft arm abuts against the sidewall of the handle.

In some exemplary embodiments, a step portion is formed at a joint between the second motor and the third shaft arm. When the handheld gimbal is switched to the storage state, the first shaft arm and the second shaft arm are folded along the rotatable connecting member, so that the second shaft arm may attach to one side of the first motor and the first shaft arm away from the top portion, and the step portion faces away from the sidewall of the handle.

It may be understood that the strategies for implementing the compactness of the handheld gimbal in storage may be combined.

Through cooperation between different structures of the handheld gimbal in the embodiments of the present disclosure, the state of the handheld gimbal can be changed, so that when the handheld gimbal is stored, gaps between different structures are relatively small, and therefore the handheld gimbal becomes more compact in storage. In addition, after folding, the holder of the folded handheld gimbal in the present disclosure is not limited between the shaft arm and the handle. This is advantageous for storage of the handheld gimbal. Therefore, switching of the handheld gimbal between the use state and the storage state is achieved, the folding structure is compact, the operations are simple, and the storage is convenient.

The following clearly and fully describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the scope of protection of the present disclosure.

Under a condition that no conflict occurs, the following embodiments and features in implementations may be combined with each other.

With reference to FIG. 1, FIG. 2A, FIG. 3, FIG. 4A, FIG. 5A, and FIG. 6A, some exemplary embodiments of the present disclosure provide a handheld gimbal, where the handheld gimbal may include a handle 1, a first shaft assembly 2, a second shaft assembly 3, a third shaft assembly 4, a holder 5, and a rotatable connecting member 6. The handle 1 has a top portion 11, a bottom portion 12, and a sidewall 13, where the sidewall 13 is located between the top portion 11 and the bottom portion 12. In some examples, the handle 1 is a rod-shaped structure. The handle 1 in this embodiment may be a non-telescopic rod with a fixed length, or may be a telescopic rod with a variable length. Certainly, the handle 1 may be in another shape. The shape of the handle 1 is not specifically limited in the present disclosure.

The first shaft assembly 2 may include a first motor 21 connected to the top portion 11 and a first shaft arm 22. The second shaft assembly 3 may include a second motor 31 and a second shaft arm 32. The third shaft assembly 4 may include a third motor 41 and a third shaft arm 42. Motor types of the first motor 21, the second motor 31, and the third motor 41 are not specifically limited in this embodiment. The motors may be direct current motors, or alternating current motors; or may be single-phase motors, or may be three-phase motors, or the like. The first shaft arm 22, the second shaft arm 32 and the third shaft arm 42 may be rod structures, or may be in other shapes. In some examples, the first shaft arm 22, the second shaft arm 32 and the third shaft arm 42 may be rod structures. The first shaft arm 22, the second shaft arm 32 and the third shaft arm 42 in this embodiment may be non-telescopic rods with fixed lengths, or may be telescopic rods with variable lengths. Certainly, the first shaft arm 22, the second shaft arm 32 and the third shaft arm 42 may also be in other shapes. Shapes of the first shaft arm 22, the second shaft arm 32 and the third shaft arm 42 are not specifically limited in the present disclosure.

In this embodiment, the rotatable connecting member 6 is disposed between the first shaft arm 22 and the second shaft arm 32. One end of the first shaft arm 22 is fixedly connected to the first motor 21, and the other end of the first shaft arm 22 is rotatably connected to the second shaft arm 32 via the rotatable connecting member 6. One end of the second shaft arm 32 away from the rotatable connection between the first shaft arm 22 and the second shaft arm 32 is fixedly connected to the second motor 31. One end of the third shaft arm 42 is fixedly connected to the second motor 31, and the other end of the third shaft arm 42 is fixedly connected to the third motor 41.

Figure 5A:
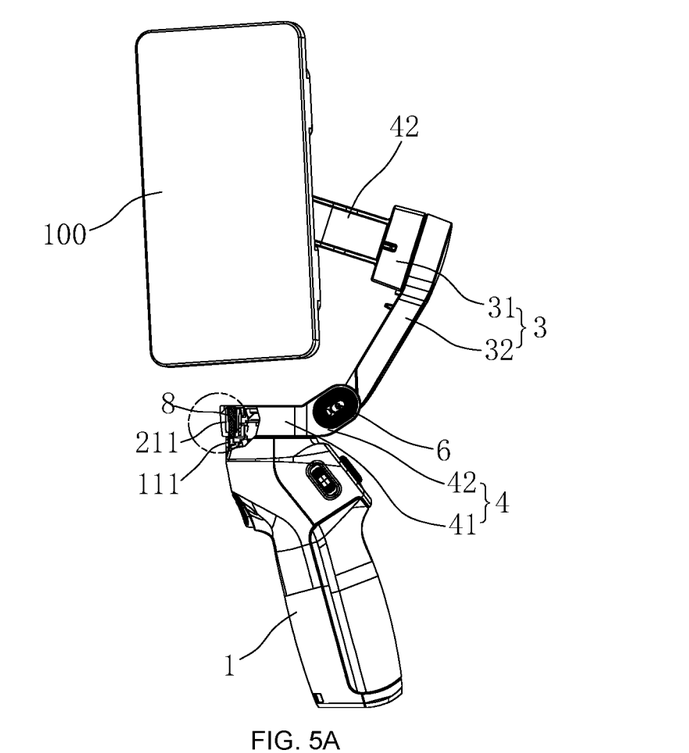
FIG. 5A is a schematic structural diagram of a handheld gimbal in a use state according to some exemplary embodiments of the present disclosure, which discloses a positional relationship between a first slot, a second slot, and a locking member of the handheld gimbal in the use state.
Figure 6A:
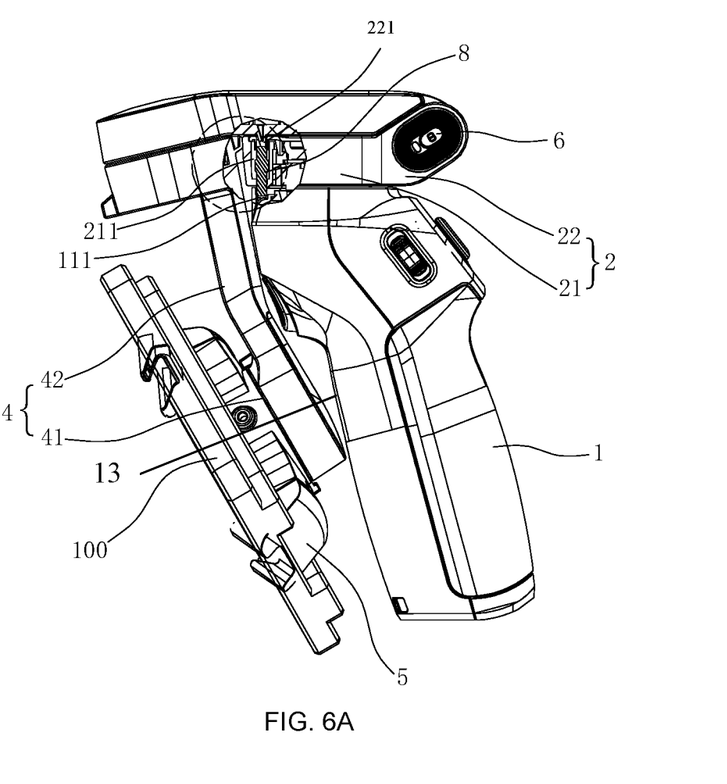
FIG. 6A is a schematic structural diagram of a handheld gimbal in a storage state according to some exemplary embodiments of the present disclosure, which discloses a positional relationship between a first slot, a second slot, and a locking member of the handheld gimbal in the storage state.

Further, the holder 5 is fixedly connected to a rotor of the third motor 41. In some examples, the holder 5 may carry an imaging lens, where the imaging lens is directly or indirectly connected to the rotor of the third motor 41. In some examples, the holder 5 may further include a carrying part configured to fix a photographing apparatus 100 (as shown in FIG. 5A and FIG. 6A), where the photographing apparatus 100 may be a camera, an intelligent terminal (such as a mobile phone or a tablet computer) having a photographing function, or another type of apparatus having a photographing function.

In some examples, the first shaft arm 22 is fixedly connected to a rotor of the first motor 21, the second shaft arm 32 is fixedly connected to a stator of the second motor 31, and the third shaft arm 42 is fixedly connected to a stator of the third motor 41. It may be understood that structures of the first shaft assembly 2, the second shaft assembly 3 and the third shaft assembly 4 are not limited to the foregoing structures. For example, the first shaft arm 22 may be a part of the rotor of the first motor 21; the second shaft arm 32 may be a part of the stator of the second motor 31; and the third shaft arm 42 may be a part of the stator of the third motor 41.

The following describes a structure of the handheld gimbal in detail by using an example in which the first shaft assembly 2 includes the first motor 21 and the first shaft arm 22, the second shaft assembly 3 includes the second motor 31 and the second shaft arm 32, and the third shaft assembly 4 includes the third motor 41 and the third shaft arm 42.

With relative rotation of the first shaft arm 22 and the second shaft arm 32, the handheld gimbal is caused to switch between a storage state and a use state. A positional relationship between the first shaft arm 22 and the second shaft arm 32 can be changed by using the rotatable connecting member 6 alone. Therefore, switching of the handheld gimbal between the use state (as shown in FIG. 1, FIG. 2A, FIG. 3, and FIG. 5A) and the storage state (as shown in FIG.

Figure 1:
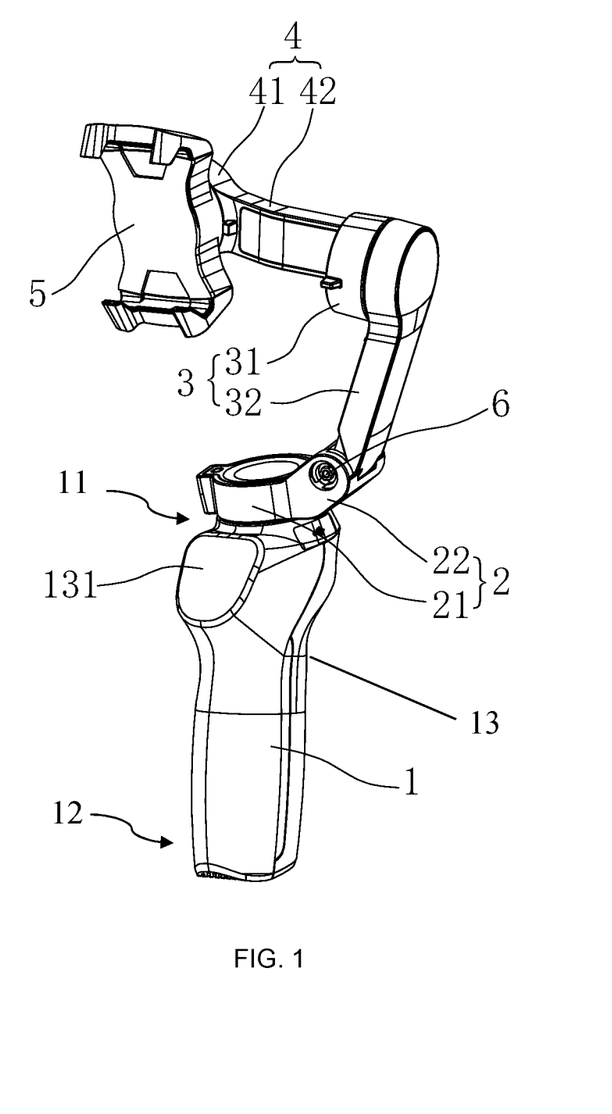
FIG. 1 is a schematic structural diagram of a handheld gimbal in a use state according to some exemplary embodiments of the present disclosure.
Figure 2A:
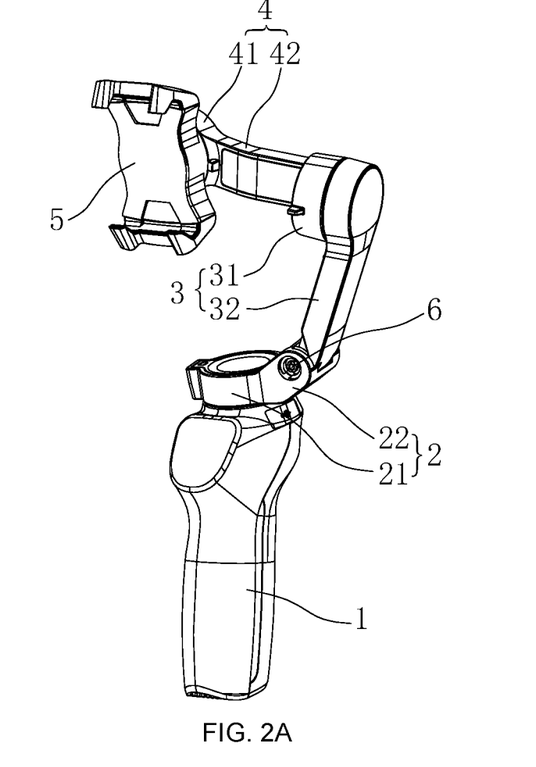
FIG. 2A is a schematic structural diagram of a handheld gimbal in a use state in another direction according to some exemplary embodiments of the present disclosure.
Figure 2B:
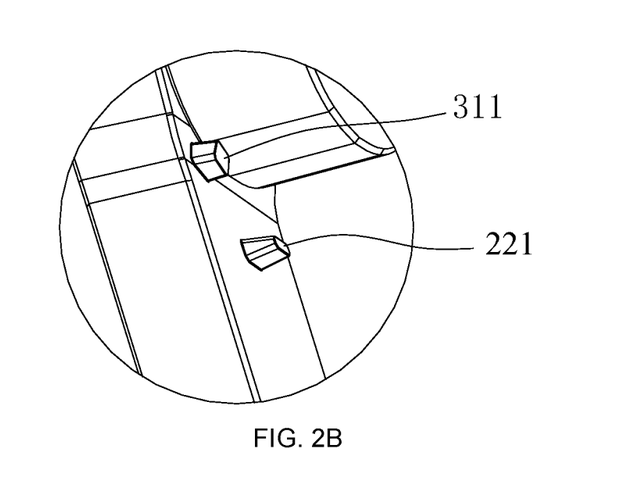
FIG. 2B is a partial enlarged diagram of the handheld gimbal in the embodiment shown in FIG. 2A.
Figure 3:
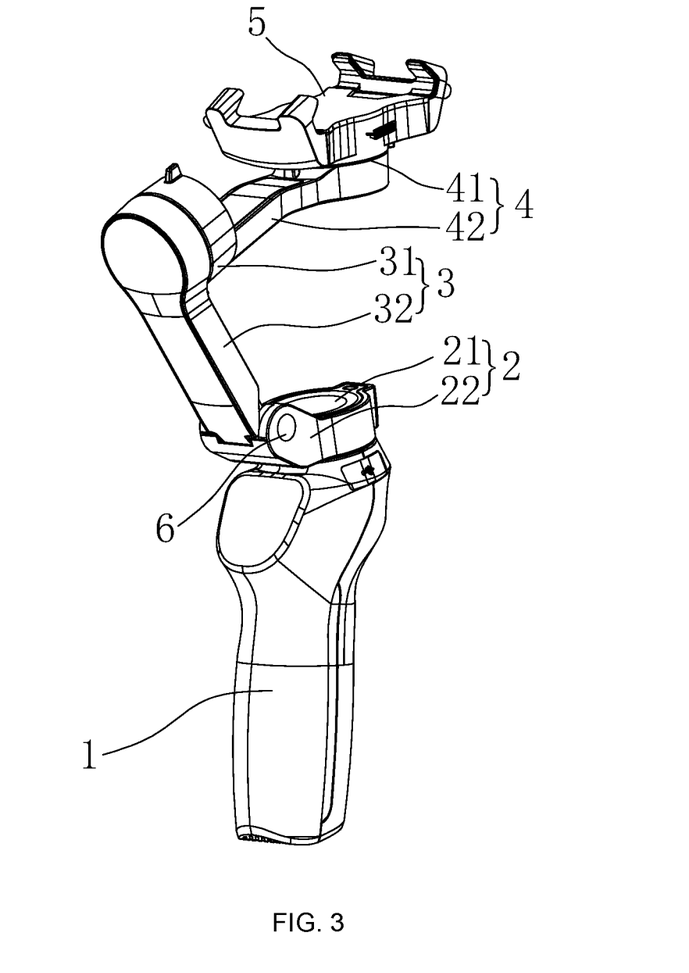
FIG. 3 is a schematic structural diagram of a handheld gimbal in a use state in still another direction according to some exemplary embodiments of the present disclosure.
Figure 4A:
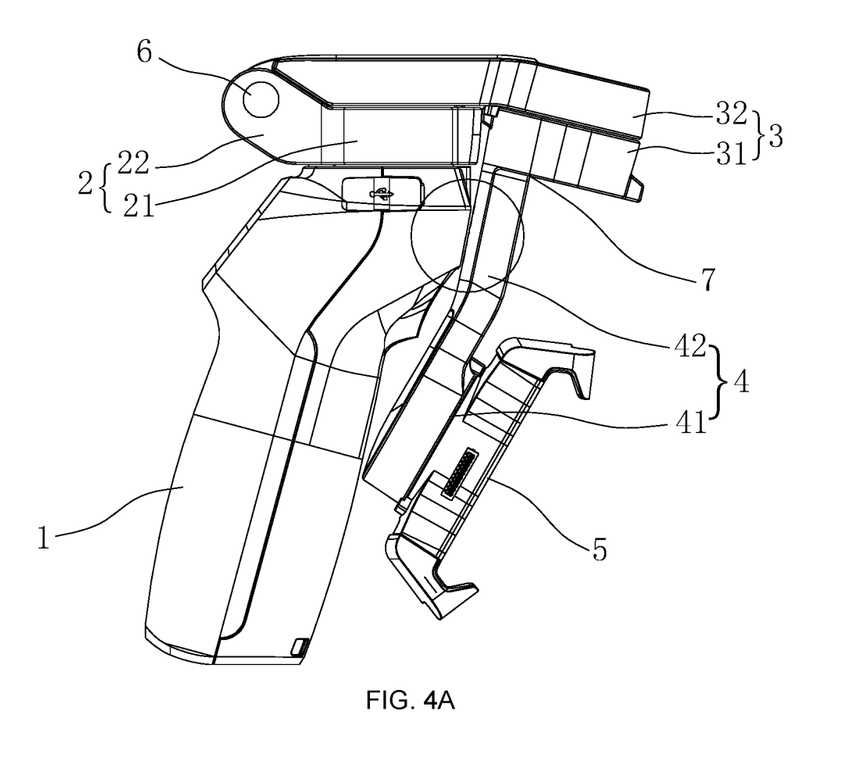
FIG. 4A is a schematic structural diagram of a handheld gimbal in a storage state according to some exemplary embodiments of the present disclosure.

4A and FIG. 6A) can be achieved, the folding structure is simple, the operations are convenient, and the costs are relatively low.

As shown in FIG. 1, FIG. 2A, FIG. 3, and FIG. 5A, when the handheld gimbal is switched to the use state, a preset angle is formed between the first shaft arm 22 and the second shaft arm 32, the first motor 21 can rotate around a first axis of rotation, the second motor 31 can rotate around a second axis of rotation, and the third motor 41 can rotate around a third axis of rotation, so as to control a posture change of the holder 5. A size of the preset angle may be set as needed. In some examples, the preset angle may be greater than 90° and less than 180°, such as 120° or 135°. In this embodiment, when the first motor 21 rotates around the first axis of rotation, the load of the first motor 21 (the load of the first motor 21 includes the first shaft arm 22, the second shaft assembly 3, the third shaft assembly 4, and the holder 5) is driven to rotate around the first axis of rotation; when the second motor 31 rotates around the second axis of rotation, the load of the second motor 31 (the load of the second motor 31 includes the third shaft assembly 4 and the holder 5) is driven to rotate around the second axis of rotation; and when the third motor 41 rotates around the third axis of rotation, the holder 5 is driven to rotate around the third axis of rotation. To make a posture change of the holder 5, at least one of the following control strategies may be employed: controlling the first motor 21 to rotate around the first axis of rotation, controlling the second motor 31 to rotate around the second axis of rotation, and controlling the third motor 41 to rotate around the third axis of rotation.

As shown in FIG. 4A and FIG. 6A, when the handheld gimbal is switched to the storage state, the first shaft arm 22 and the second shaft arm 32 are folded along the rotatable connecting member 6, so that the second shaft arm 32 may attach to one side of the first motor 21 and the first shaft arm 22 away from the top 11. After the handheld gimbal in this embodiment is folded, no gap exists between the second shaft arm 32 and one side of the first shaft arm 22 and the first motor 21 away from the top portion 11, so that the handheld gimbal becomes more compact in storage.

On the basis that the first shaft arm 22 and the second shaft arm 32 are folded along the rotatable connecting member 6, further, the stored handheld gimbal may become more compact based on the cooperation between other structures of the handheld gimbal. It should be noted that in this embodiment of the present disclosure, after the first shaft arm 22 and the second shaft arm 32 are folded along the rotatable connecting member 6, other structures of the handheld gimbal automatically cooperate to form a folding form.

The following describes in detail how the cooperation between other structures of the handheld gimbal makes the handheld gimbal more compact in storage.

In some exemplary embodiments, when the handheld gimbal is switched to the storage state, the first motor 21 and the second motor 31 are arranged side by side, and the first motor 21 and the second motor 31 abut against each other, so that the first motor 21 and the second motor 31 limit each other. After the handheld gimbal in this embodiment is folded, no gap exists between the first motor 21 and the second motor 31, so that the handheld gimbal becomes more compact in storage. In addition, an abutting face between the first motor 21 and the second motor 31 effectively limits relative rotation between the first motor 21 and the second motor 31 during folding, and helps the handheld gimbal stably stay in the storage state.

In some examples, when the handheld gimbal is switched to the storage state, an axis of the first motor 21 intersects with an axis of the second motor 31, which is advantageous for the cooperation of the third shaft arm 42, the third motor 41 and the sidewall 13 of the handle 1. Further, the second shaft arm 32 has a turning point, and when the handheld gimbal is switched to the storage state, the turning point of the second shaft arm 32 protrudes out of one end of the first motor 21 far away from the rotatable connection between the first shaft arm 22 and the second shaft arm 32 (that is, one end of the first motor 21 that is farthest away from the first shaft arm 22). This is advantageous for oblique abutting between the first motor 21 and the second motor 31. In some examples, the second shaft arm 32 is approximately in a V shape, and when the handheld gimbal switches to the storage state, an opening of the V shape of the second shaft arm 32 approximately faces downward. In this embodiment, when the handheld gimbal is switched to the storage state, the bottom portion 12 of the handle 1 faces downward. In this case, that the handle 1 faces upward is used as a reference for "up" and "down". It may be understood that when the handheld gimbal is switched to the storage state, the axis of the first motor 21 may also be parallel with the axis of the second motor 31.

In some exemplary embodiments, when the handheld gimbal is switched to the storage state, at least a part of the third motor 41 abuts against the sidewall 13 of the handle 1. After the handheld gimbal in this embodiment is folded, a gap between the third motor 41 and the sidewall 13 of the handle 1 is reduced, so that the handheld gimbal becomes more compact in storage; in addition, since the third motor 41 abuts against the sidewall 13 of the handle 1, it is ensured that the holder 5 is not located between the third motor 41 and the sidewall 13 of the handle 1 in storage of the handheld gimbal. This reduces a risk of collision between the holder 5 and the sidewall 13 of the handle 1 in storage of the handheld gimbal; in addition, when the handheld gimbal is stored, the holder 5 can still be used.

In some examples, when the handheld gimbal is switched to the storage state, one end of the third motor 41 away from the third shaft arm 42 fixedly connected to the second motor 31 (that is, one end of the third motor 41 that is farthest away from the second motor 31) abuts against the sidewall 13 of the handle 1. Generally, the shape of the side wall 13 of the handle 1 needs to be designed to conform to the user's holding habits. Hence, the sidewall 13 of the handle 1 has a recessed portion (not shown). When the handheld gimbal is switched to the storage state, one end of the third motor 41 away from the fixed connection between the third shaft arm 42 and the second motor 31 abuts against one side of the recessed portion near the bottom 12.

In some exemplary embodiments, the third shaft arm 42 has a turning point, and when the handheld gimbal is switched to the storage state, a shape of the third shaft arm 42 adapts to the shape of the sidewall 13 of the handle 1, so that at least a part of the third shaft arm 42 abuts against the sidewall 13 of the handle 1. After the handheld gimbal in this embodiment is folded, since the shape of the third shaft arm 42 adapts to the shape of the sidewall 13 of the handle 1, and at least a part of the third shaft arm 42 abuts against the sidewall 13 of the handle 1, a gap between the third shaft arm 42 and the sidewall 13 of the handle 1 can be reduced, so that the handheld gimbal becomes more compact in storage.

Figure 4B:
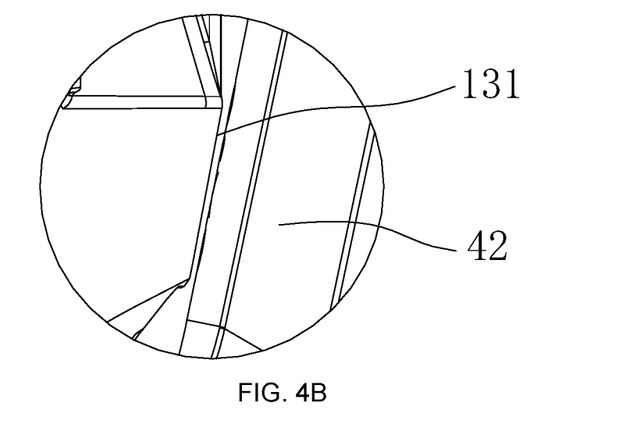
FIG. 4B is a partial enlarged diagram of the handheld gimbal in the embodiment shown in FIG. 4A.

In some examples, the sidewall 13 of the handle 1 has a limiting surface; and when the handheld gimbal is switched to the storage state, one part of the third shaft arm 42 abuts against the limiting surface 131, to prevent the second motor 31 from rotating relative to the handle 1. This helps the handheld gimbal stably stay in the storage state. The limiting surface 131 is located between the recessed portion and the top portion 11. It may be understood that a manner of abutting between the third shaft arm 42 and the sidewall 13 of the handle 1 is not limited to the foregoing surface contact manner. Alternatively, a point contact manner may be selected. Certainly, for preventing the second motor 31 from rotating relative to the handle 1, other manners may also be used herein. As shown in FIG. 4B, when the handheld gimbal is switched to the storage state, one part of the third shaft arm 42 is parallel with the limiting surface 131, and a gap between the third shaft arm 42 and the limiting surface 131 is less than a preset threshold. This can also prevent the second motor 31 from rotating relative to the handle 1, and thus helps the handheld gimbal stably stay in the storage state.

In some examples, the third shaft arm 42 is approximately in a V shape, and when the handheld gimbal is switched to the storage state, an opening of the V shape of the third shaft arm 42 faces toward the sidewall 13 of the handle 1. This is advantageous for cooperation between the third motor 41 and the sidewall 13 of the handle 1. Further in some examples, the opening of the V shape of the third shaft arm 42 is closed to one side of the recessed portion away from the bottom portion 12.

In some examples, when the handheld gimbal is switched to the storage state, a load gravity center of the second shaft assembly 3 falls on an axis of the second motor 31, and this can keep the handheld gimbal balance in storage. It should be noted that in this embodiment of the present disclosure, the load of the second shaft assembly 3 is the load carried by the second motor 31 and specifically includes the third shaft assembly 4 and the holder 5. When the holder 5 includes the carrying part configured to fix the photographing apparatus 100, the load of the second shaft assembly 3 may further include the photographing apparatus 100 fixed to the carrying part.

In some exemplary embodiments, a step portion 7 is formed at a joint between the second motor 31 and the third shaft arm 42 (as shown in FIG. 4A); and when the handheld gimbal is switched to the storage state, the step portion 7 faces away from the sidewall 13 of the handle 1. If the step portion 7 faces toward the sidewall 13 of the handle 1 when the handheld gimbal is stored, the existence of the step portion 7 may cause a large gap between the third shaft arm 42 and the sidewall 13 of the handle 1. While when the handheld gimbal in this embodiment is stored, the step portion 7 faces away from the sidewall 13 of the handle 1, and this reduces the gap between the third shaft arm 42 and the sidewall 13 of the handle 1, so that the handheld gimbal becomes more compact in storage. Referring to FIG. 4A again, the step portion 7 in this embodiment is in an "L" shape.

It may be understood that the manners of cooperation for achieving the compactness of the handheld gimbal in storage may be combined.

In addition, whether the second shaft arm 32 is folded along the rotatable connecting member 6 relative to the first shaft arm 22 may be controlled based on a manual control manner or an automatic control manner, so that the handheld gimbal can be switched between the use state and the storage state. For the automatic control manner, a key trigger control or another automatic trigger manner may be selected.

When the handheld gimbal in this embodiment is stored, since the holder 5 is not located between the third motor 41 and the sidewall 13 of the handle 1, the holder 5 can still be used when the handheld gimbal is stored. For example, if the holder 5 includes an imaging lens, when the handheld gimbal is stored, the imaging lens can still be used for photographing, and a difference thereof from use of the imaging lens for photographing when the handheld gimbal is in the use state lies in that when the imaging lens of the handheld gimbal in the storage state is used for photographing, a posture switch cannot be achieved for the imaging lens by means of the first motor 21 and the second motor 31; however, the third motor 41 may be controlled to switch a posture for the imaging lens. In addition, in this embodiment, since in storage the holder 5 is located on an open side of the step portion, and thus is not limited due to narrow space; accordingly, the size and shape of the imaging lens are not limited by limited space, and may be selected and changed based on the photographing needs of a user. For example, in one case, a circular imaging lens may be selected. In another case, a square imaging lens may be selected. Certainly in other cases, imaging lenses of other sizes or shapes may be selected, which is not limited herein.

In the case where the holder 5 includes the carrying part configured to fix the photographing apparatus 100, the photographing apparatus 100 may continue to be used for photographing, and the photographing apparatus 100 may be further operated. Moreover, the handheld gimbal carrying the photographing apparatus 100 may be stored. Correspondingly, a difference between the use of the photographing apparatus 100 for photographing when the handheld gimbal is in the storage state and the use of the photographing apparatus 100 for photographing when the handheld gimbal is in the use state lies in that when the photographing apparatus 100 of the handheld gimbal in the storage state is used for photographing, a posture switch cannot be achieved for the photographing apparatus 100 by means of the first motor 21 and the second motor 31; however, the third motor 41 may be controlled to switch a posture for the photographing apparatus 100. When the handheld gimbal carrying the photographing apparatus 100 is stored, the photographing apparatus 100 may be stored with the handheld gimbal together instead of being stored separately. This saves storage space, and is more advantageous for carrying the handheld gimbal by a user for outdoor use.

Referring to FIG. 4A and FIG. 6A again, when the handheld gimbal is switched to the storage state, the holder 5 is located on one side of the third motor 41 away from the sidewall 13 of the handle 1. This ensures that the holder 5 can still be used when the handheld gimbal is stored.

The following describes in detail a positional relationship of the holder 5 when the handheld gimbal is stored in the case where the holder 5 includes the carrying part for fixing the photographing apparatus 100.

When an existing handheld gimbal having a folding function is in a storage state, a bearing structure for carrying a photographing apparatus is arranged between a shaft assembly and a handle, and the storage function can be finished only when the photographing apparatus is removed from the bearing structure; therefore, the use is inconvenient. In this embodiment, when the handheld gimbal is switched to the storage state, the carrying part is located on one side of the third motor 41 away from the sidewall 13 of the handle 1. In comparison with the existing handheld gimbal, in this embodiment of the present disclosure, the handheld gimbal carrying the photographing apparatus can be stored, and can be used more conveniently. In addition, when the handheld gimbal is stored, the photographing apparatus 100 can continue to be used for photographing;

and the photographing apparatus 100 can be further operated to perform video playback or the like.

A structure of the carrying part may be designed as needed. For example, in some exemplary embodiments, the carrying part is a clamping structure. When the handheld gimbal is switched to the storage state, an opening of the clamping structure faces away from the third motor 41. This arrangement of the opening of the clamping structure can ensure that when the handheld gimbal is stored, the photographing apparatus 100 can face outside. Hence, it would be convenient for a user to use the photographing apparatus 100.

Further, the clamping structure in this embodiment has a locked state and an unlocked state. When the clamping structure is in the unlocked state, the clamping structure can clamp and fix the photographing apparatus 100, and the third motor 41 can rotate around the third axis of rotation. When the clamping structure is in the locked state, the clamping structure is locked on the third shaft arm 42 to limit the rotation of the third motor 41. In some examples, when the handheld gimbal is switched to the storage state, the clamping structure automatically switches to the locked state. In some examples, when the handheld gimbal is switched to the storage state, and the clamping structure is still in the unlocked state, a user needs to switch the clamping structure to the locked state manually. In addition, when the clamping structure is in the locked state, the clamping structure may be switched from the locked state to the unlocked state by way of an automatic unlocking (key/button unlocking) manner or a manual unlocking manner. A locking structure implemented by the clamping structure and the third shaft arm 42 may be a conventional structure, which will not be described in this embodiment.

It may be understood that the structure of the carrying part is not limited to the design of the clamping structure, and may also be another structure.

In the foregoing embodiment, when the handheld gimbal is switched to the storage state, the rotatable connecting member 6 can easily rotates under an external force. Therefore, the handheld gimbal cannot be kept in the storage state, and this is disadvantageous for storing and carrying the handheld gimbal. In this embodiment, a locking manner is used to keep the handheld gimbal in the storage state.

For example, in some exemplary embodiments, with reference to FIG. 2B and FIG. 5A to FIG. 6B, a first slot 111 is provided on the top portion 11, the first motor 21 is provided with a second slot 211, a locking member 8 is disposed in the second slot 211, and a locking protrusion 221 is provided on the second shaft arm 32. In this embodiment, when the first slot 111 is aligned with the second slot 211, it indicates that the handheld gimbal can be switched to the storage state, that is, the handheld gimbal can be switched from the use state to the storage state only when the first slot 111 is aligned with the second slot 211; if the first slot 111 is not aligned with the second slot 211, the handheld gimbal cannot be switched from the use state to the storage state.

Figure 6B:
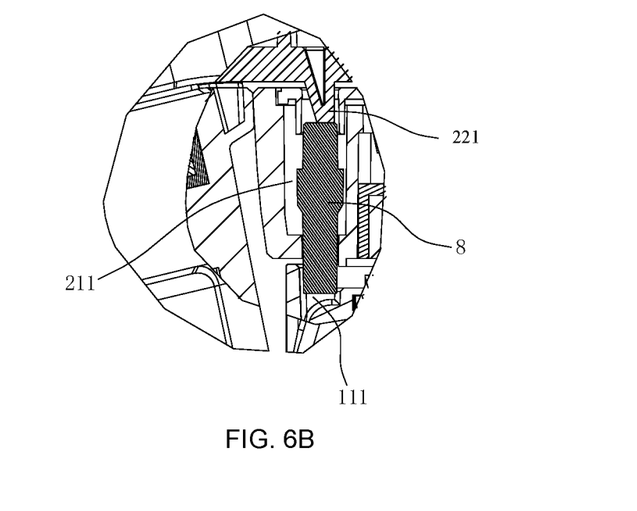
FIG. 6B is a partial enlarged diagram of the handheld gimbal in the embodiment shown in FIG. 6A.

When the first slot 111 is aligned with the second slot 211, the second shaft arm 32 is triggered to rotate toward the first shaft arm 22 along the rotatable connecting member 6, so that the locking protrusion 221 enters the second slot 211; during the process in which the locking protrusion 221 enters into the second slot 211, the locking protrusion 221 may trigger the locking member 8 in the second slot 211 to move toward the first slot 111, so that a part of the locking member 8 enters the first slot 111 and engages with the first slot 111, as shown in FIG. 6A and FIG. 6B, so as to prevent the first shaft assembly 2 and the second shaft assembly 3 from rotating relative to the handle 1, and thus the handheld gimbal retains in the storage state. In this embodiment, the engagement between the locking member 8 and the first slot 111 makes the first motor 21 unable to rotate relative to the handle 1, so that the first shaft assembly 2 is prevented from rotating relative to the handle 1. In addition, due to the engagement between the locking protrusion 221 and the second slot 211, the second shaft arm 32 is fixed on the first motor 21, so that the second shaft assembly 3 is prevented from rotating relative to the handle 1. An interference fit may be selected for implementing the fixing between the locking member 8 and the first slot 111 and the fixing between the locking protrusion 221 and the second slot 211, or other manners may be selected for implementing the fixing.

In some examples, a stator of the first motor 21 may be fixedly connected to the top portion 11, and relative positions of the first slot 111 and the second slot 211 are always unchanged, that is, the first slot 111 is always aligned with the second slot 211.

Figure 5B:
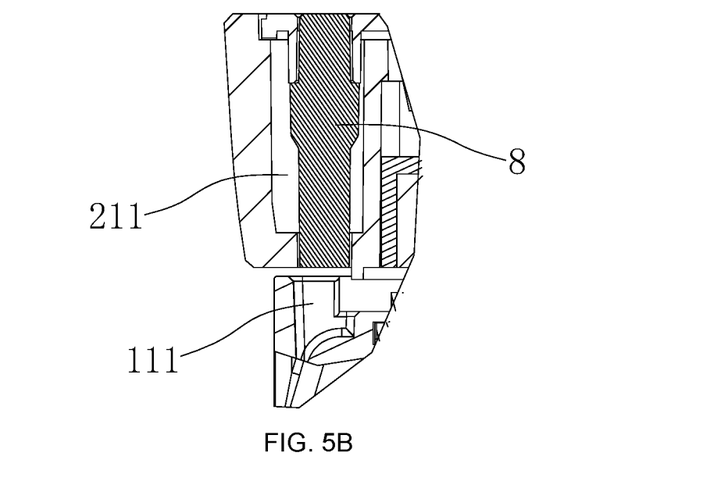
FIG. 5B is a partial enlarged diagram of the handheld gimbal in the embodiment shown in FIG. 5A.

In other examples, the rotor of the first motor 21 is fixedly connected to the top portion 11; the rotor of the first motor 21 is disposed in the second slot 211; and the locking protrusion 221 is disposed on the second shaft arm 32. In a rotation process of the rotor of the first motor 21, a position of the second slot 211 relative to the first slot 111 changes, and the rotor of the first motor 21 can rotate relative to the handle 1 to align the first slot 111 with the first slot 111, as shown in FIG. 5A and FIG. 5B.

The locking member 8 in this embodiment may be an elastic member, such as an elastic member made of an elastic material or an elastic member having a spring. Certainly, the locking member 8 may also be a non-elastic member.

When the handheld gimbal is in the storage state, the handheld gimbal may also be controlled to switch from the storage state to the use state in a different manner.

For example, in some examples, the user may manually operate (for example, push or pull) the second shaft arm 32 to rotate along the rotatable connecting member 6 relative to the first shaft arm 22, so that the second shaft arm 32 gradually moves away from the first motor 21. During the process in which the second shaft arm 32 gradually moves away from the first motor 21, the locking protrusion 221 moves in a direction away from the second slot 211. During the process in which the locking protrusion 221 gradually detaches from the second slot 211, the locking member 8 may move in a direction away from the first slot 111 under an elastic recovery force. When the locking protrusion 221 completely detaches from the second slot 211, the locking member 8 may be reset under the elastic recovery force, and thus is completely accommodated within the second slot 211. In this way, both the first motor 21 and the second shaft arm 32 may rotate relative to the handle 1, and the handheld gimbal is switched to the use state.

In other examples, an unlocking portion is provided on the sidewall 13 of the handle 1, and the unlocking portion can cooperate with the locking member 8. When the unlocking portion is operated, the locking member 8 can be pushed by the unlocking portion to move in a direction away from the first slot 111 to detach from the first slot 111, and when the locking member 8 pushes the locking protrusion 221 out of the second slot 211, the handheld gimbal can switch from the storage state to the use state. The unlocking portion may be operated in a press manner, a pull manner, a push manner, or other operation manners. The unlocking portion may be an electronic unlocking structure, or may be a mechanical unlocking structure. Specifically, the type of the unlocking portion may be selected as needed.

Further, in some exemplary embodiments, the second motor 31 may rotate to a preset position, which indicates that the handheld gimbal can be switched to the storage state, that is, when the second motor 31 rotates to the preset position, the handheld gimbal can be switched from the use state to the storage state. If the second motor 31 does not rotate to the preset position, that is, if the first shaft arm 22 and the second shaft arm 32 are folded, it is possible that the second motor 31 does not rotate to an appropriate position or that the second motor 31 and/or the third shaft assembly 4 cannot be folded in an appropriate position, making the handheld gimbal unable to switch from the use state to the storage state.

In some examples, the preset position is a limiting position of the second motor 31. Based on the limiting state of the second motor 31, a user can recognize whether the handheld gimbal can be switched from the use state to the storage state. Further, the stator of the second motor 31 may be provided with a limiting protrusion 311 for limiting the rotation of a rotor of the second motor 31, and the limiting protrusion 311 is disposed near the locking protrusion 221. Before the handheld gimbal is switched from the use state to the storage state, a user may need to control the second motor 31 to rotate to the position of the limiting protrusion 311.

It may be understood that the preset position is not limited to this limiting position of the second motor 31 and may also be another rotation position of the second motor 31.

A process of operating the handheld gimbal to switch from the use state to the storage state may include: controlling the first motor 21 to rotate relative to the handle 1 so that the first slot 111 is aligned with the second slot 211, controlling the second motor 31 to rotate to the limiting position, where these two steps may be performed simultaneously or sequentially; after controlling the first motor 21 to rotate relative to the handle 1 so that the first slot 111 is aligned with the second slot 211 and controlling the second motor 31 to rotate to the limiting position, operating the first shaft arm 22 and the second shaft arm 32 to fold these two shaft arms along the rotatable connecting member 6, so that the locking protrusion 221 enters the second slot 211; in the process in which the locking protrusion 221 enters the second slot 211, the locking protrusion 221 presses the locking member 8 in the second slot 211 downward, so that the locking member 8 moves toward the first slot 111, when a part of the locking member 8 enters the first slot 111 and engages with the first slot 111, the handheld gimbal switches from the use state to the storage state, and can retain in the storage state.

The rotatable connecting member 6 may be a hinge member, or may be another type of rotatable member.

In some exemplary embodiments, the rotatable connecting member 6 may provide a supporting force; when the handheld gimbal is switched to the use state, the preset angle between the first shaft arm 22 and the second shaft arm 32 can be maintained by the supporting force from the rotatable connecting member 6. In this embodiment, the handheld gimbal may be kept in the use state by the supporting force from the rotatable connecting member 6. In some examples, the rotatable connecting member 6 may include a damping structure; when the handheld gimbal is switched to the use state, the preset angle between the first shaft arm 22 and the second shaft arm 32 is maintained by a supporting force from the damping structure. The damping structure may be one of the following structures: a spring leaf, a cam, an elastic pin, and a torsional spring, but is not limited to the structures listed herein. Certainly, the rotatable connecting member 6 may also include other structures to provide a supporting force, so that the handheld gimbal is kept in the use state.

In other embodiments, the rotatable connecting member 6 may include a rotation axle that cannot provide a supporting force. When the handheld gimbal is switched to the use state, the rotation axle is not able to maintain the handheld gimbal in the use state; rather it needs to cooperate with another structure(s) in order to maintain the handheld gimbal in the use state. In some examples, the first shaft arm 22 is provided with a locking mechanism, and the second shaft arm 32 is provided with a locking slot. In some examples, the first shaft arm 22 is provided with a locking slot, and the second shaft arm 32 is provided with a locking mechanism. When the second shaft arm 32 rotates relative to the first shaft arm 22 along the rotation axle to the extent where a preset angle is formed between the first shaft arm 22 and the second shaft arm 32, the locking mechanism engages with the locking slot to maintain the preset angle between the first shaft arm 22 and the second shaft arm 32, and thus maintain the handheld gimbal in the use state. In this embodiment, when the first shaft arm 22 and the second shaft arm 32 rotate along the rotation axle to the extent where the preset angle is formed between the first shaft arm 22 and the second shaft arm 32, the locking mechanism engages with locking slot for locking, so as to maintain the preset angle between the first shaft arm 22 and the second shaft arm 32, and thus maintain the handheld gimbal in the use state. For the locking and engaging manner of the locking mechanism and the locking slot, a conventional locking and engaging manner may be selected herein.

Further, in some examples, under a press operation, the locking mechanism may switch between an unlocked state and a locked state. When the second shaft arm 32 rotates relative to the first shaft arm 22 along the rotation axle to the extent where the preset angle is formed between the first shaft arm 22 and the second shaft arm 32, the locking mechanism is triggered to enter the locked state; when the locking mechanism is in the unlocked state, the second shaft arm 32 may rotate relative to the first shaft arm 22 along the rotation axle. In some examples, when the second shaft arm 32 rotates relative to the first shaft arm 22 along the rotation axle to the extent where the preset angle is formed between the first shaft arm 22 and the second shaft arm 32, the locking mechanism automatically enters the locking slot to lock and engage with the locking slot. In some examples, when the second shaft arm 32 rotates relative to the first shaft arm 22 along the rotation axle to the extent where the preset angle is formed between the first shaft arm 22 and the second shaft arm 32, a user may manually operates the locking mechanism, so that the locking mechanism enters the locking slot to lock and engage with the locking slot.

In some examples, when the handheld gimbal is in the use state, the first axis of rotation, the second axis of rotation and the third axis of rotation are orthogonal to each other. In other examples, when the handheld gimbal is in the use state, at least two of the first axis of rotation, the second axis of rotation and the third axis of rotation are oblique to each other. An intersection manner of the first axis of rotation, the second axis of rotation and the third axis of rotation may be selected as needed when the handheld gimbal is used.

In this embodiment, the first axis of rotation is a yaw axis, the second axis of rotation is a pitch direction, and the third axis of rotation is a roll direction. When the handheld gimbal is in the use state, the yaw axis is approximately parallel with a vertical direction. In some examples, the yaw axis is parallel with the vertical direction. Certainly, rotation directions of the first axis of rotation, the second axis of rotation and the third axis of rotation may also be in other manners. For example, the first axis of rotation is the yaw axis, the second axis of rotation is the roll axis, and the third axis of rotation is the pitch axis.

When a conventional gimbal is in a use state, its handhold direction is parallel with a vertical direction, making it difficult for a user to hold the handheld gimbal, and causing poor holding experience. In view of this, in this embodiment, when the handheld gimbal is in the use state, an extension direction of the handle 1 (which may refer to a connection line from a center point of the top portion 11 of the handle 1 to a center point of the bottom portion 12, or may be parallel with this connection line) is oblique to the yaw axis. Since the holding direction of the handle 1 held by the user and the extension direction of the handle 1 are in the same direction when the handheld gimbal is in the use state, the holding direction is also oblique to the yaw axis. Therefore, the user can hold the handle 1 more easily and conveniently. In this embodiment, when the handheld gimbal is in the use state, the extension direction of the handle 1 is oblique to the yaw axis. This facilitates the user's holding, improves the user's experience of holding the handle 1 in the use state, and makes it more convenient for the user to use the handheld gimbal. In some examples, an angle between the extension direction of the handle 1 and the yaw axis may be greater than or equal to 5° and less than or equal to 45°, for example, 5°, 10°, 15°, 20°, 30°, 40°, 45°, or other angles between 5° and 45°.

It should be noted that the relational terms such as first and second in this disclosure are used only to differentiate an entity or operation from another entity or operation, and do not require or imply any actual relationship or sequence between these entities or operations. The terms "comprise", "include", or any other variant thereof is intended to cover a non-exclusive inclusion, so that a process, a method, an article, or a device that includes a series of elements not only includes this series of elements but also includes other elements that are not explicitly mentioned, or may further includes an element(s) inherent to the process, method, article, or device. In absence of more constraints, an element defined by "includes a . . . " does not preclude the existence of another identical element(s) in the process, method, article, or device that includes the element.

The handheld gimbal provided by the embodiments of the present disclosure is described in detail above. The principles and implementations of the present disclosure are described herein by using specific examples. The description of the embodiments is merely provided to help understand the method and core idea of the present disclosure. In addition, a person of ordinary skill in the art can make variations and modifications to the present disclosure in terms of the specific implementations and application scopes according to the idea of the present disclosure. Therefore, the contents in this disclosure shall not be construed as a limitation on the present disclosure.

What is claimed is:
1. A handheld gimbal, comprising:
   a handle, including a top portion, a bottom portion, and a sidewall located between the top portion and the bottom portion;
   a first shaft assembly, including a first motor connected to the top portion, and a first shaft arm;
   a second shaft assembly, including a second motor, and a second shaft arm fixedly connected to the second motor;
   a third shaft assembly, including a third motor and a third shaft arm, wherein a first end of the third shaft arm is fixedly connected to the second motor, and a second end of the third shaft arm is fixedly connected to the third motor;
   a holder, fixedly connected to a rotor of the third motor; and
   a rotatable connecting member, disposed between the first shaft arm and the second shaft arm, wherein
   a first end of the first shaft arm is fixedly connected to the first motor, a second end of the first shaft arm is rotatably connected to the second shaft arm via the rotatable connecting member, and a relative rotation between the first shaft arm and the second shaft arm renders the handheld gimbal to switch between a storage state and a use state,
   in the storage state, the first shaft arm and the second shaft arm are folded along the rotatable connecting member, so that the second shaft arm attaches to one side of the first motor and the first shaft arm away from the top portion, and at least a part of the third motor abuts against the sidewall of the handle,
   in the use state, a preset angle is formed between the first shaft arm and the second shaft arm, the first motor is rotatable around a first axis of rotation, the second motor is rotatable around a second axis of rotation, and the third motor is rotatable around a third axis of rotation, so as to control a posture of the holder.

2. The handheld gimbal according to claim 1, wherein in the storage state, one end of the third motor that is away from the second end of the third shaft arm abuts against the sidewall of the handle.

3. The handheld gimbal according to claim 1, wherein the third shaft arm includes a turning point, and in the storage state, a shape of the third shaft arm adapts to a shape of the sidewall of the handle, so that at least a part of the third shaft arm abuts against the sidewall of the handle.

4. The handheld gimbal according to claim 3, wherein the sidewall of the handle includes a limiting surface, and in the storage state one part of the third shaft arm abuts against the limiting surface to prevent the second motor from rotating relative to the handle; and
   the third shaft arm is in a V shape, and in the storage state an opening of the V shape faces toward the sidewall of the handle.

5. The handheld gimbal according to claim 3, wherein in the storage state, a load gravity center of the second shaft assembly falls on an axis of the second motor.

6. The handheld gimbal according to claim 1, wherein in the storage state, the first motor and the second motor are arranged side by side and abut against each other to limit each other.

7. The handheld gimbal according to claim 1, wherein a step portion is formed at a joint between the second motor and the third shaft arm; and
   in the storage state, the step portion faces away from the sidewall of the handle.

8. The handheld gimbal according to claim 1, wherein in the storage state, the holder is located on one side of the third motor away from the sidewall of the handle.

9. The handheld gimbal according to claim 8, wherein the holder includes a carrying part configured to fix a photographing apparatus; and
   in the storage state, the carrying part is located on the side of the third motor away from the sidewall of the handle.

10. The handheld gimbal according to claim 9, wherein the carrying part is a clamping structure; and in the storage state, an opening of the clamping structure faces away from the third motor.

11. The handheld gimbal according to claim 10, wherein the clamping structure includes a locked state and an unlocked state;
in the unlocked state, the clamping structure is configured to clamp and fix the photographing apparatus, and the third motor is rotatable around the third axis of rotation; and
in the locked state, the clamping structure is locked on the third shaft arm to limit a rotation of the third motor.

12. The handheld gimbal according to claim 1, wherein the top portion includes a first slot, the first motor includes a second slot, a locking member is disposed in the second slot, and a locking protrusion is disposed on the second shaft arm;
the handheld gimbal becomes switchable to the storage state when the first slot is aligned with the second slot; and
aligning the first slot with the second slot triggers a rotation of the second shaft arm toward the first shaft arm along the rotatable connecting member, so that the locking protrusion enters the second slot to trigger the locking member in the second slot to move toward the first slot, so that a part of the locking member enters the first slot and engages with the first slot to prevent the first shaft assembly and the second shaft assembly from rotating relative to the handle, and maintain the handheld gimbal in the storage state.

13. The handheld gimbal according to claim 12, wherein a rotor of the first motor is fixedly connected to the top portion, the second slot is disposed on the rotor of the first motor, the rotor of the first motor rotates relative to the handle, so as to align the first slot with the second slot, and the locking protrusion is disposed on the second shaft arm;
an unlocking portion is disposed on the sidewall of the handle, and by operating the unlocking portion, the locking member is pushed to move in a direction away from the first slot to detach from the first slot and push the locking protrusion out of the second slot, so as to allow the handheld gimbal to switch from the storage state to the use state; and
that the second motor rotates to a preset position indicates that the handheld gimbal becomes switchable to the storage state.

14. The handheld gimbal according to claim 13, wherein the preset position is a limiting position of the second motor.

15. The handheld gimbal according to claim 14, wherein a stator of the second motor includes a limiting protrusion adjacent to the locking protrusion to limit a rotation of a rotor of the second motor.

16. The handheld gimbal according to claim 1, wherein the preset angle between the first shaft arm and the second shaft arm is maintained by a supporting force from the rotatable connecting member when the handheld gimbal switches to the use state.

17. The handheld gimbal according to claim 16, wherein the rotatable connecting member includes a damping structure to provide a supporting force to maintain the preset angle between the first shaft arm and the second shaft arm when the handheld gimbal switches to the use state.

18. The handheld gimbal according to claim 1, wherein one of the first shaft arm and the second shaft arm includes a locking mechanism, and the other one of the first shaft arm and the second shaft arm includes a locking slot;
after the preset angle is formed between the first shaft arm and the second shaft arm by rotating the second shaft arm relative to the first shaft arm along a non-support rotation axle of the rotatable connecting member, the locking mechanism engages with the locking slot to maintain the preset angle between the first shaft arm and the second shaft arm, and maintain the handheld gimbal in the use state.

19. The handheld gimbal according to claim 18, wherein the locking mechanism is switchable between an unlocked state and a locked state by a press operation;
the second shaft arm is rotatable relative to the first shaft arm along the axis of rotation in the unlocked state; and
after the preset angle is formed between the first shaft arm and the second shaft arm by rotating the second shaft arm relative to the first shaft arm along the non-support rotation axle of the rotatable connecting member, the locking mechanism is triggered to enter the locked state.

20. The handheld gimbal according to claim 1, wherein the first axis of rotation is a yaw axis, the second axis of rotation is a pitch axis, and the third axis of rotation is a roll axis; an extension direction of the handle is oblique relative to the yaw axis; and an angle between the extension direction of the handle and the yaw axis is greater than or equal to 5° and less than or equal to 45°.

* * * * *